United States Patent
Meinander

(10) Patent No.: US 7,691,184 B2
(45) Date of Patent: Apr. 6, 2010

(54) METHOD AND ARRANGEMENT AT GAS REMOVAL, AND THE USE THEREOF

(75) Inventor: Paul Meinander, Grankulla (FI)

(73) Assignee: POM Technology Oy AB, Helsingfors (FI)

( * ) Notice: Subject to any disclaimer, the term of this patent is extended or adjusted under 35 U.S.C. 154(b) by 820 days.

(21) Appl. No.: 10/554,449

(22) PCT Filed: Apr. 22, 2004

(86) PCT No.: PCT/FI2004/000249

§ 371 (c)(1),
(2), (4) Date: Oct. 4, 2006

(87) PCT Pub. No.: WO2004/097107

PCT Pub. Date: Nov. 11, 2004

(65) Prior Publication Data

US 2007/0028778 A1 Feb. 8, 2007

(30) Foreign Application Priority Data

Apr. 25, 2003 (FI) .................................. 20030627

(51) Int. Cl.
*B01D 19/00* (2006.01)
(52) U.S. Cl. .......................................... 95/261; 96/210
(58) Field of Classification Search .................. 95/261; 96/209–212
See application file for complete search history.

(56) References Cited

U.S. PATENT DOCUMENTS

| 1,440,808 | A | * | 1/1923 | Wineman | ..................... 96/210 |
| 2,147,993 | A | * | 2/1939 | Scheibe | ........................ 96/210 |
| 2,187,646 | A | * | 1/1940 | Darrieus | ........................ 95/261 |
| 2,578,568 | A | * | 12/1951 | Mayer et al. | ................... 96/210 |
| 2,757,581 | A | | 8/1956 | Freeman et al. | |
| 4,369,047 | A | * | 1/1983 | Arscott et al. | .................. 95/243 |
| 5,622,545 | A | | 4/1997 | Mazzei et al. | |
| 5,807,427 | A | * | 9/1998 | Welch | ......................... 96/210 |
| 6,019,825 | A | | 2/2000 | Greene et al. | |

(Continued)

FOREIGN PATENT DOCUMENTS

EP 0425311 5/1991

(Continued)

*Primary Examiner*—Duane Smith
*Assistant Examiner*—Douglas J Theisen
(74) *Attorney, Agent, or Firm*—Browdy and Neimark, PLLC

(57) ABSTRACT

The invention relates to an arrangement for gas removal including a vertical cylindrical vessel (1) having an outlet (8) and a tangentially arranged inlet (6). The inlet includes means which bring an incoming fluid (4) into a jet which is sharply delimited in the radial direction and runs close to the vessel's (1) inner surface (5) at such a high initial velocity that an upwards open whirlpool (12) comprising a curved fluid surface (11) is formed. The outlet (8) is arranged tangentially at a level which is below the fluid surface (11). The invention also relates to a method for degassing a process fluid, wherein a deep whirlpool (12) including a curved fluid surface (11) is formed in a cylindrical vessel. At said fluid surface gas is brought to escape by means of centrifugal forces acting within the fluid. The invention further relates to the use of the above arrangement and method, respectively, for deaerating a process fluid in paper- or cellulose making.

12 Claims, 2 Drawing Sheets

U.S. PATENT DOCUMENTS

Figure 4:
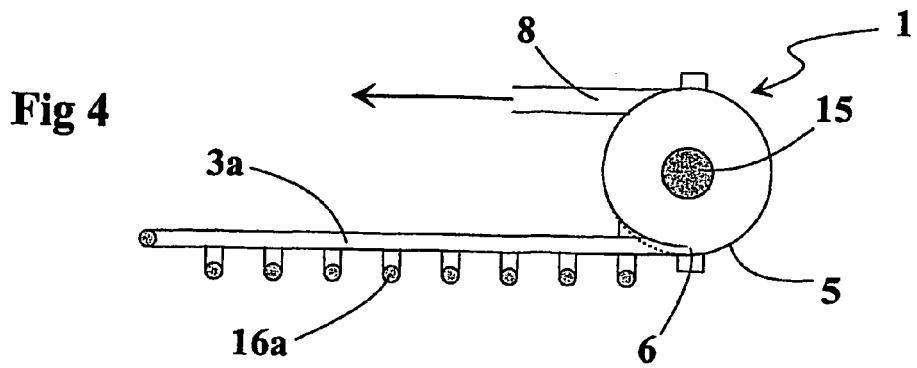

| | | | |
|---|---|---|---|
| 6,096,120 A * | 8/2000 | Erlund et al. | 96/182 |
| 6,238,110 B1 | 5/2001 | Jensen et al. | |
| 6,630,013 B2 * | 10/2003 | Myrttinen et al. | 95/243 |
| 2002/0011151 A1 * | 1/2002 | Myrttinen et al. | 95/261 |
| 2003/0015462 A1 | 1/2003 | Komura et al. | |

FOREIGN PATENT DOCUMENTS

| | | |
|---|---|---|
| EP | 0475252 | 3/1992 |
| FI | 98792 * | 4/1995 |
| FI | 110796 | 6/2002 |
| JP | 10076107 | 3/1998 |
| WO | WO/02/053831 | 11/2002 |

* cited by examiner

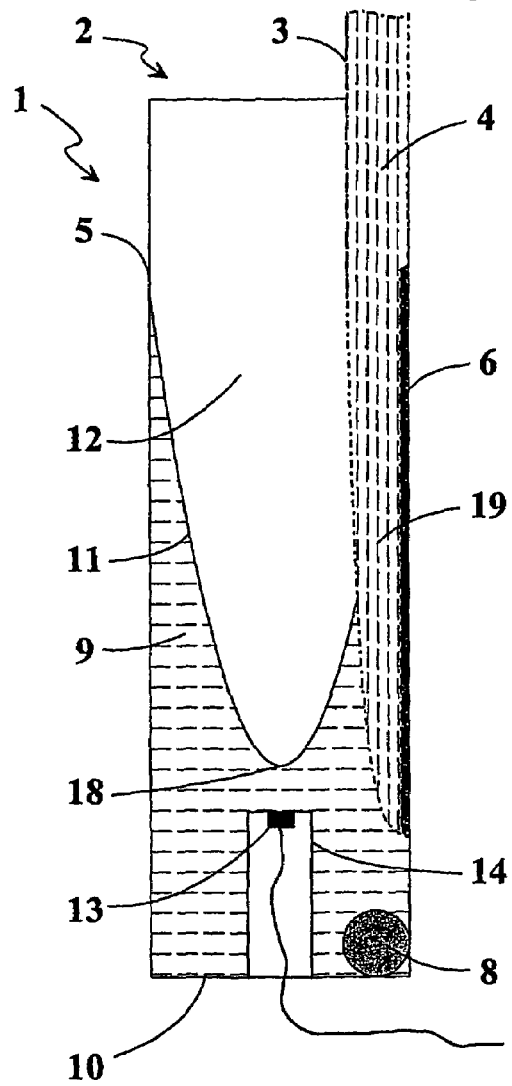
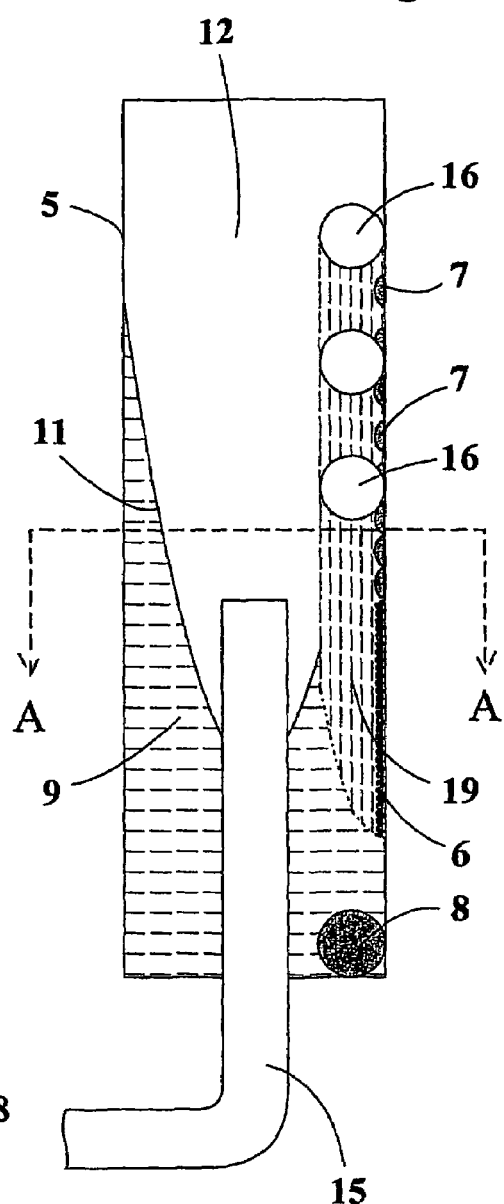
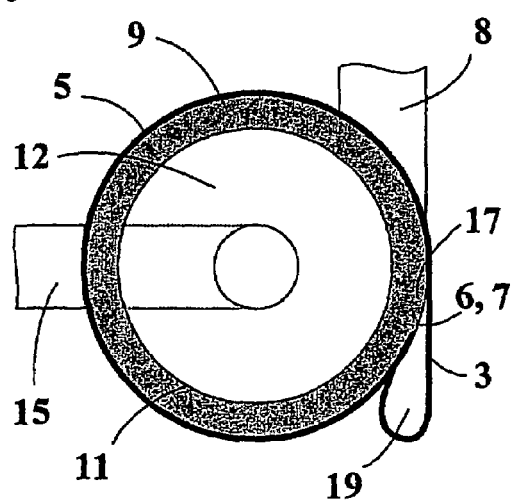

METHOD AND ARRANGEMENT AT GAS REMOVAL, AND THE USE THEREOF

The present invention relates to a method and an arrangement at gas removal (degassing) and especially gas removal in connection with papermaking. Especially, the present invention relates to a method for degassing a process fluid in a cyclone comprising a vertically arranged cylindrical vessel having at least one outlet and at least one inlet which is arranged tangentially. The present invention also relates to an arrangement for degassing a process fluid, which arrangement includes a cylindrical vessel having at least one outlet and at least one inlet which is arranged tangentially. The present invention further relates to the use of an arrangement as well and, respectively, a method for removing air at the production of paper or cellulose.

In process industry it is common that air or other gases will be contained in a process fluid in increasing amounts as the process proceeds, and this phenomenon will increase as the speed of the process increases. For example, in papermaking air in the process fluid will bring about disturbances in the process and, especially, risks for quality problems, and for this reason one strives, as far as possible, to remove gas from such process water which will be recirculated back into the process, which, on the other hand, is essential for the efficiency of the process, for the energy economy and considering environmental impacts.

Long known arrangements for removing air or other gases from process water comprise basins where the gas within the fluid gradually escapes without any further technical measures taken. Such basins require large volumes and a slow throughput, and since large quantities of fluid in a process lead to the process slowing down with respect to, i.a., process control and changes of quality, one nowadays strives to a reduction of the amounts of fluid in the process. At the same time as the speed then increases other means must be used in order to remove gas from the process fluid. Known arrangements then commonly comprise vacuum, mechanical means or a combination of these.

Thus, e.g., U.S. Pat. No. 6,096,120 discloses an arrangement including a fluid reservoir having a multitude of inlets, a free horizontal fluid surface, a multitude of overflows, an outlet for degassed fluid as well as an exhaust for gas. The purpose of the arrangement is to utilize one and the same degassing reservoir volume for a multitude of fluid flows, but the fact remains that the amounts of fluid which in the respective situations reside in the deaerating reservoir render a rapid control of the process and, for example, a rapid change of quality in a paper machine impossible.

U.S. Pat. No. 2,757,581, on the other hand, discloses a cyclone arrangement for degassing a papermaking pulp. The arrangement comprises a vessel which is slightly tapered downwards and has a tangential inlet at the upper end and a central outlet at the lower end. Due to the centrifugal force, fluid which is tangentially pumped in through said inlet at the upper end of the vessel will be pressed towards the wall of the vessel while the fluid will move downwards by means of gravity. In the center of the vessel an axially extending space is then formed which is free of fluid, and gas is drawn out from this space by means of vacuum in a central tube at the upper end of the vessel. For the arrangement to work it has to be meticulously dimensioned which makes the arrangement not very suitable for such varying fluid flows which emanate in connection with a rapid change of the driving parameters at a change of quality.

An arrangement which is included as a part of a larger concept which is sold under the trade name OptiFeed™ is also known. This arrangement comprises a rather large collecting vessel into which process water form different parts of the process is conveyed tangentially through cylindrical tubes, then to be centrally pumped further for removing of gas. Although a certain passive deaeration will take place in such a reservoir, practical tests show that the degassing will be incomplete, i.a., since the thick jets of fluid which are directed in into the reservoir tend to diverge and not remain in a congregated state within the vessel. Normally, pumping of a fluid containing gas is problematic, and thus it is desirable that the primary degassing takes place prior to pumping the fluid.

The object of the present invention is to provide a simple arrangement for degassing which to a far extent automatically adapts to varying flows and where thus one and the same apparatus allows even very high variations in the fluid flow.

One object of the present invention is also to provide an arrangement where the starting up of the degassing can take place rapidly and essentially automatically.

In order to achieve said objects a method is suggested a method which is characterized by the teaching of claim 7, and further an arrangement having the characteristics as disclosed in claim 1. Thus, the method according to the present invention is characterized in that the process fluid is conducted into the vessel through the inlet at such a velocity and, respectively, to such a delimited extent in a radial direction that a whirlpool is formed along the walls of the vessel, which whirlpool comprises a fluid surface having a deep curved rotational surface, that gas is brought to exit at said fluid surface by means of centrifugal forces acting within the fluid, and that fluid is drawn off tangentially below said whirlpool.

The apparatus, again, is characterized in that the respective inlet includes means which bring the fluid into at least one jet which is sharply delimited in the radial direction and which runs close to the inner surface of the vessel at such a high initial velocity that a whirlpool builds up within the vessel so that the surface of the fluid obtains a shape corresponding to a deep curved rotational surface, and that the outlet is arranged tangentially and at a level which is located below the fluid surface.

Generally the present invention encompasses that gas contained within the process fluid which is conveyed into the vessel, is brought into rotation at a high speed. The fluid is fed tangentially and closely along a surface of the vessel through at least one inlet which suitably has a considerable vertical extent along the inner wall surface of the vessel to a level that is at least partially below the deep curved rotational surface of the whirlpool, while at the same time the extent in the radial direction is small, favorably so that the inlet is shaped essentially as a slit. By means of such an arrangement the fluid is brought to a rapid rotation along the inner surface of the vessel. The centrifugal force acting on the fluid mass will press the fluid forcefully against the essentially uniform cylindrical inner surface of the vessel. The fluid surface of the whirlpool obtains a shape which can be controlled generally to correspond to, for example, the shape of a deep paraboloide. If the dimensions and, respectively, the driving parameters are such that the fluid can keep its velocity and g is $\approx 1/r$, a whirlpool will be created which will be steeper inwards, in which case the fluid surface will obtain a shape which is rather like an inverted hyperboloide, which suitably is counteracted by means of a central body or vortex finder.

Gas, on which the centrifugal force does not act to any mentionable degree, will be actively separated out into the free space which is formed in the shape of the whirlpool in the center of the vessel, from which space gas can be evacuated by means known per se. Due to gravity the fluid will gradually sink downwards within the vessel and be extracted through a tangentially arranged outlet. In this way a stable continuous rotation of fluid is maintained within the vessel, where fluid containing gas is fed at the upper part along the surface of the vessel and degassed fluid is correspondingly extracted at the lower part of the vessel.

The invention will now be described in more detail with reference to some favorable embodiments and the enclosed drawing, wherein FIG. 1 in section discloses an embodiment including one unitary feed channel which, in the disclosed case, is essentially vertical, FIG. 2 in section discloses an alternative embodiment including a multitude of feed channels, FIG. 3 discloses the arrangement according to FIG. 2, at a section A-A, FIG. 4 in a view from above discloses how the arrangement according to the present invention suitably is combined with a separate arrangement for feeding fluid from separate parts of the process, FIG. 5 in a sectional side view discloses the arrangement according to FIG. 4, and FIG. 6 discloses an favorable arrangement for controlling the slit and the feed of fluid to the vessel.

Referring to FIG. 1 the apparatus includes an essentially cylindrical vessel 1 which at its upper end 2 may be even entirely open, or suitably be provided with means known per se such as hoods or fans (not shown) for extracting separated gas. The inlet to the vessel 1 includes a feed 3 which can be in the shape of an open flute 3a, in the shape of one or a multitude of pipes 16, 16a or in some other way so that process fluid 4 from, e.g., papermaking can be conveyed under pressure into the vessel 1 tangentially along the surface of the wall 5 of the vessel. In order to stabilize the function it is favorable that at least the lower portion of the inlet is formed as an inlet chamber 19, of which FIGS. 4 and 5 disclose an especially favorable form including separate feed pipes 16a which are directed in through respective drain traps.

Said feed 3 or inlet chamber 19 end in a suitably unitary slit 6 for feeding fluid, or a in number of separate nozzles 7 located one above the other, which nozzles in the embodiment disclosed in FIG. 2 favorably are slightly elongated to connect closely to the surface of the inner wall 5 of the vessel 1.

The feed 3 of process fluid 4 is kept under such a pressure that the fluid will flow, under high speed, favorably at least 2 meters/second, suitably 4 to 6 meters/second into the vessel 1 in the form of a fluid stream 17 which in the axial direction of the vessel 1 is essentially elongated and extending along the wall surface 5 or the vessel. The slit and/or nozzles are dimensioned so that the stream into the vessel is maintained in an essentially laminar state, and by means of the high speed in combination with the tangential feed closely along the surface a stable rotation is achieved, where the respective water element generally streams outwards-downwards so that it in due time reaches an tangentially arranged outlet 8.

Due to the rotation, fluid 9 which circulates within the vessel will be pressed towards the walls 5 as well as sink down towards a bottom 10 of the vessel 1, thus forming a whirlpool in the center of the vessel, the fluid surface 11 of said whirlpool having the shape of a curved rotational body. Above said fluid surface 11 a free space 12 is formed, which extends from the fluid surface 11 up to the upper part 2 of the vessel 1. The gas bubbles that are set free due to the centrifugal force will make for this free space 12 from which gas can be removed without directing any vacuum to the vessel 1 as such, which, in comparison to known gas removal arrangements, provides a considerably simpler structure.

As an example only it can be noted that if the inlet height, i.e., the height of the liquid column which supplies the feed 3, as an average is, e.g., 2 meters the average speed at the wall surface 5 will be $(2 \text{ gh})^{1/2}$=6.3 m/sec. At a vessel diameter of 0.8 m an angular velocity of 15.75 $s^{-1}$ and thus a centrifugal acceleration of $n^2 \ast r$=99.2 $m/sec^2$ or about 10 g will be obtained. This is sufficient for separating large gas bubbles from the fluid at a rather high rate. The curved shape which the fluid surface 11 obtains causes large bubbles to emerge easily at higher levels in the vessel, while smaller bubbles in due time will make for the free space 12 from the inner portions of the fluid mass 9 in the lower part of the vessel. In this way and through very simple means an outgoing fluid is obtained which, for most purposes, is sufficiently well deaerated.

The vessel 1 can be provided with a vortex finder for controlling the process and especially for avoiding an unappropriately deep depth, for example a central level indicator 13 which is arranged at a stabilizer 14 at the lower end of the vessel 1, thus providing information regarding the position of the whirlpool and especially regarding the level at which the bottom 18 of the whirlpool is positioned. Such an arrangement is disclosed in FIG. 1. Alternatively, the vessel can have a central overflow tube 15, in which case air bubbles in the lower part of the vessel 1 collect around said tube 15 and are conveyed upwards along it. Favorably, the arrangement further comprises a conventional overflow 15a arranged at one side of the vessel 1, as is schematically indicated in FIG. 5, and through which any possible fluid surplus can be diverted. Such an overflow 15a favorably leads further to the inlet for a corresponding further degassing arrangement (not shown). In this manner a multitude of degassing arrangements according to the present invention can be connected in series, in which case degassed fluid also can be conveyed to different parts of a process.

In the table below some parameter combinations are indicated, which describe examples of some internal relations between certain central dimensioning factors:

|  | A | B | C | D | E | F |
|---|---|---|---|---|---|---|
| Q | 100 | 200 | 300 | 100 | 200 | 500 |
| Ø | 500 | 500 | 500 | 1000 | 1000 | 1000 |
| $S_o$ | 50 | 50 | 50 | 25 | 50 | 100 |
| $S_h$ | 1000 | 1000 | 1000 | 1000 | 1000 | 1000 |
| $Ø_{vf}$ | 200 | 200 | 200 | 400 | 400 | 400 |
| $V_i$ | 2.0 | 4.0 | 6.0 | 4.0 | 4.0 | 5.0 |
| $h_i$ | 0.2 | 0.8 | 1.8 | 0.8 | 0.8 | 1.3 |
| G | 16 | 64 | 144 | 32 | 32 | 50 |
| $g_p$ | 1.6 | 6.5 | 14.7 | 3.3 | 3.3 | 5.1 |
| $g_v$ | 4.1 | 16.3 | 36.7 | 8.2 | 8.2 | 12.7 |
| $v_v$ | 0.6 | 1.0 | 1.5 | 0.1 | 0.3 | 0.6 | wherein Q indicates the flow in liters pro second, Ø indicates the vessel's diameter in millimeters, $S_o$ indicates the opening width of the slit in millimeters, $S_h$ indicates the height of the slit in millimeters, $Ø_{vf}$ indicates the diameter of the vortex finder in millimeters, $v_i$ indicates the inlet speed of the fluid meters pro second, $h_i$ indicates the hydraulic level of the inlet in meters, G describes the centrifugal force in $m/sec^2$ whereby $g_p$ indicates the acceleration at the periphery and $g_v$ indicates the acceleration at the vortex finder and $v_v$ indicates the vertical flow speed.

Figure 5:
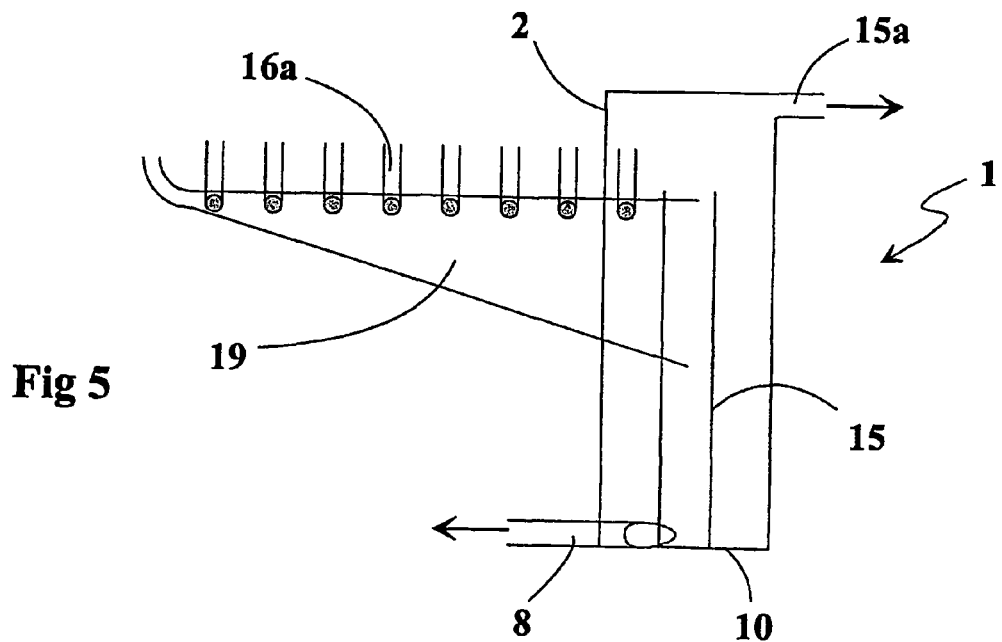

If the inlet 3 is essentially open in the upwards direction, as disclosed in FIG. 1, or especially in the shape of an open flute 3a according to FIG. 4, the level therein will settle in a balance which depends on the inflow and the speed of the outflow, which is a function of the pressure. Again, FIG. 2 discloses an embodiment where the inlet includes a multitude of tubes 16 which are directed to an inlet chamber 19. In both cases the system is self-regulating and if the amount of incoming fluid is small the fluid surface will settle at a balanced level along the inlet slit 6 and/or the inlet tubes 7.

At the dimensioning of the system consideration is taken to the fact that a pressure towards the periphery of the vortex will build up, which makes the resistance of the incoming stream to increase towards the bottom of the vortex.

Figure 6:
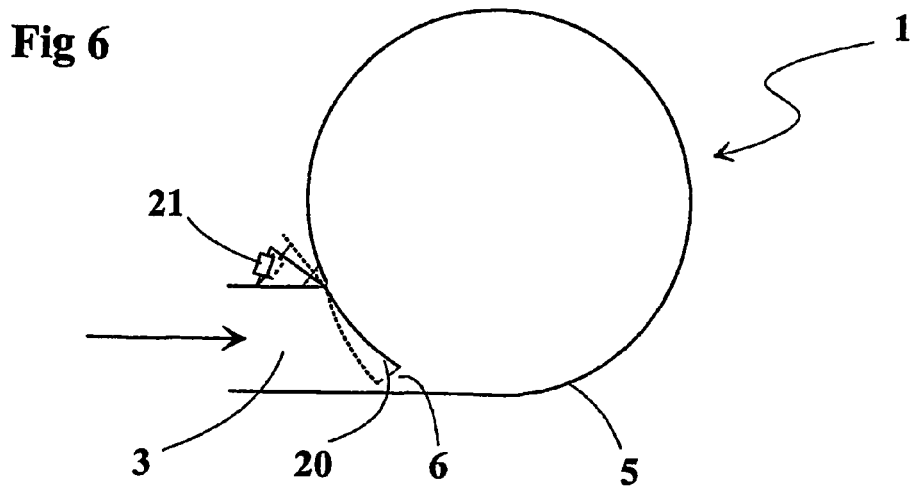

FIG. 6 discloses how the width of the slit 6 easily can be varied by means of a movable slit segment 20, the position of which is controlled by a force member 21, for example one or several hydraulic or pneumatic cylinders, spindle motors or the like.

Other embodiments are evident from the appended claims. It should be observed that above has been disclosed embodiments with only one inlet, but the invention covers also embodiments wherein a multitude of inlets are arranged along the periphery of the vessel. Further, the Figures mainly disclose embodiments wherein the slit 6 and, respectively, the inlet tubes 7 are arranged to have an essentially vertical extent, but in certain embodiments the inlets 6 and 7, respectively, run at least slightly helically along the wall surface 5 of the vessel. For the person skilled in the art it is clear that the invention can be modified also in other manners within the scope of the appended claims.

The invention claimed is:

1. An arrangement for degassing a process fluid, which arrangement includes a cylindrical vessel, which is arranged vertically,
   wherein said cylindrical vessel includes an inlet, which is arranged tangentially, so that in the vessel there will be formed a whirl which opens upwards and includes a curved fluid surface having a shape which generally corresponds to the surface of a rotational body,
   wherein said cylindrical vessel includes an outlet, which is arranged tangentially,
   wherein said cylindrical vessel has a wall having an inner surface,
   wherein said inlet includes jet feeding means formed vertically along the wall of the cylindrical vessel and which bring an incoming fluid into the shape of at least one jet which is sharply delimited in the radial direction and which runs close to said inner surface of said wall of said vessel at a high initial velocity,
   wherein said inlet extends downward in a vertical direction to a level that is at least partially below said curved fluid surface of said whirl, and
   wherein said outlet is arranged at a level which is located below said curved fluid surface of said whirl.

2. The arrangement as defined in claim 1, wherein said inlet has an elongated shape in the vertical direction, suitably as a unitary favorably narrow slit.

3. The arrangement as defined in claim 1, wherein said inlet includes an inlet chamber which extends along the wall of the vessel.

4. The arrangement as defined in any one of claims 1 to 3, wherein means are arranged at the lower end of the vessel for measuring, determining or defining a vortex of the fluid, which means favorably are connected to means for controlling the function of the arrangement, where a peripheral surface of means favorably at the same time constitute a collector surface for gas to be conveyed upwards.

5. The arrangement as defined in claim 4, wherein said means for controlling the function of the arrangement are arranged to control, on the basis of information regarding said vortex, the amount of fluid which is fed in through said inlet and/or the shape of the inlet and/or other parameters or means which exert an impact on the shape and/or the velocity of the whirl.

6. The arrangement as defined in claim 1, wherein means are arranged at the central axis of said vessel and/or at the periphery of said vessel to divert gas and/or surplus fluid, suitably so that an overflow which is arranged at the upper periphery of the vessel leads forwards to a further favorably identical gas removing stage, while a central overflow suitably is arranged as a central tube which extends upwards from the bottom of the vessel, where an outer surface of said tube at the same time favorably functions as a collector surface for gas.

7. The arrangement of claim 1, wherein said arrangement is adapted to remove air from process water during paper- or cellulose making.

8. The arrangement as defined in claim 1, wherein said at least one inlet is formed of corresponding separate inlets which are arranged one above the other.

9. A method for degassing a process fluid in a cyclone which cyclone includes a vertically arranged cylindrical vessel having an outlet which is arranged tangentially and an inlet which is arranged tangentially so that in the vessel there will be formed a whirl which opens upwards and includes a curved fluid surface having a shape which generally corresponds to the surface of a rotational body, and wherein said cylindrical vessel has a wall with an inner surface,
   wherein a process fluid is fed into said vessel (1) through jet feeding means of said inlet, wherein the inlet is formed vertically along said wall of said cylindrical vessel and extends downward in a vertical direction at least partially below said curved fluid surface of said whirl so that said fluid will obtain a vertical distribution along said inner surface of said wall of said vessel and at such a velocity and, respectively, in such a radially restricted dimensional extent that said whirl is formed along said inner surface of said wall of said vessel,
   wherein gas of said process fluid is brought to escape at said surface of said whirl by means of centrifugal forces acting within said process fluid, and
   wherein degassed process fluid is drawn off tangentially below the bottom of said whirl.

10. The method as defined in claim 9, wherein the gas from the fluid is conveyed upwards along a peripheral surface of a central means which is arranged in said vessel and which favorably at the same time is utilized for defining a vortex and/or which functions as an overflow for gas and/or fluid.

11. The method as defined in claim 9 or 10, wherein an incoming flow of the fluid is controlled with respect to its amount, pressure and/or direction on the basis of parameters which are defined at least on the basis of favorably real time information regarding the general shape of the surface of the whirl, and/or so that the position of said fluid surface is controlled as a function of a relation between an incoming and outgoing flow of fluid by controlling the amount of fluid which passes through at least one inlet and/or outlet.

12. The method of claim 9, wherein said method removes air from process water during paper- or cellulose making.

* * * * *